Patented June 6, 1939

2,161,261

UNITED STATES PATENT OFFICE 2,161,261

PARASITICIDE

Jacob M. Schaffer, Laurel, Paul D. Harwood, College Park, and Everett E. Wehr, Takoma Park, Md.; dedicated to the free use of the People in the territory of the United States No Drawing. Application November 29, 1938, Serial No. 242,930

4 Claims. (Cl. 167—53.1)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People in the territory of the United States to take effect on the granting of a patent to use.

Our invention relates to parasiticides adapted for use in treating birds affected with gapeworms. It is well known that this parasite is especially injurious to turkeys and young chickens.

Heretofore, the treatment of birds for the elimination of parasites, such as the gapeworm, has been attended with great difficulty and loss of life of the treated birds. As a matter of fact, there is no treatment known, which can be depended upon to product results with a high degree of efficiency in large groups of birds, without loss of life. Not only are the known methods unsatisfactory, but many of them are also expensive, laborious, and difficult of administration. The object of our invention, therefore, is to provide a simple, effective and safe therapeutic treatment of birds affected with gapeworms, and to designate a group of chemicals which can be utilized with our method to produce satisfactory results.

We have found that compounds of the general class of the sparingly soluble antimonyl tartrates, which in water are less soluble than potassium antimonyl tartrate, such as barium antimonyl tartrate, silver antimonyl tartrate, cadmium antimonyl tartrate, stannous antimonyl tartrate, and so forth, when administered into the tracheae of birds affected with gapeworms, free them of the infestation. By sparingly soluble in the claims, we mean soluble to the extent of at least 0.01 percent and not more than 6 percent, in water at 25° C. In the past, the soluble antimonyl tartrates, such as potassium antimonyl tartrate and sodium antimonyl tartrate, have been used as parasiticides for intravenous injection into man and beast. Such soluble substances, however, when administered to birds affected with gapeworms are too toxic and are unsatisfactory for practical use.

In carrying out our invention, we prefer to prepare and use the particular antimonyl tartrate compound in dust form, which is to be understood as embracing any finely divided form, such as powder or minute crystals, and so forth. With the compound thus prepared, it may be administered in any one of a number of ways, such as dusting directly into the pharyngeal cavity of the birds; subjecting the birds to an atmosphere, preferably confined, containing a suspension of the dust, etc. We have found, where the birds are treated in a suitably confined atmosphere, that as little as one-fifteenth gram of the compound per bird is effective.

Having thus described our invention, what we claim for Letters Patent is:

1. A parasiticide adapted for pharyngeal administration to birds affected with gapeworms, said parasiticide containing as its essential active ingredient a sparingly soluble metallic antimonyl tartrate.

2. A parasiticide adapted for pharyngeal administration to birds affected with gapeworms, said parasiticide containing as its essential active ingredient barium antimonyl tartrate.

3. A parasiticide adapted for pharyngeal administration to birds affected with gapeworms, said parasiticide containing as its essential active ingredient silver antimonyl tartrate.

4. A parasiticide adapted for pharyngeal administration to birds affected with gapeworms, said parasiticide containing as its essential active ingredient stannous antimonyl tartrate.

JACOB M. SCHAFFER.
PAUL D. HARWOOD.
EVERETT E. WEHR.